(12) United States Patent
Williams et al.

(10) Patent No.: US 11,290,765 B2
(45) Date of Patent: Mar. 29, 2022

(54) SECURING AN OVERLAY NETWORK AGAINST ATTACK

(71) Applicant: Akamai Technologies, Inc., Cambridge, MA (US)

(72) Inventors: Brandon O. Williams, Revere, MA (US); Liza Alenchery, Cambridge, MA (US); Yixin Jin, Quincy, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 241 days.

(21) Appl. No.: 16/267,578

(22) Filed: Feb. 5, 2019

(65) Prior Publication Data

US 2019/0246160 A1 Aug. 8, 2019

Related U.S. Application Data

(60) Provisional application No. 62/626,718, filed on Feb. 6, 2018.

(51) Int. Cl.
| | |
|---|---|
| *H04N 21/266* | (2011.01) |
| *H04L 12/46* | (2006.01) |
| *H04L 12/715* | (2013.01) |
| *H04L 29/06* | (2006.01) |
| *H04N 21/6334* | (2011.01) |
| *H04L 9/32* | (2006.01) |
| *H04L 9/00* | (2006.01) |
| *H04L 45/64* | (2022.01) |

(52) U.S. Cl.
CPC ....... *H04N 21/26613* (2013.01); *H04L 9/006* (2013.01); *H04L 9/3242* (2013.01); *H04L 12/4633* (2013.01); *H04L 45/64* (2013.01); *H04L 63/0272* (2013.01); *H04L 63/061* (2013.01); *H04L 63/0815* (2013.01); *H04L 63/123* (2013.01); *H04N 21/63345* (2013.01); *H04L 2463/061* (2013.01)

(58) Field of Classification Search
CPC ........ H04N 21/26613; H04N 21/63345; H04L 63/123; H04L 63/061; H04L 12/4633; H04L 45/64; H04L 63/0815; H04L 9/3242; H04L 63/0272; H04L 9/006; H04L 2463/061; H04L 9/0872; H04L 9/0838; H04L 2209/60; H04L 45/50
USPC .......................................................... 726/26
See application file for complete search history.

(56) References Cited

U.S. PATENT DOCUMENTS

| | | | | |
|---|---|---|---|---|
| 2006/0227773 | A1* | 10/2006 | Grewal | .................. H04L 63/123 370/389 |
| 2014/0281530 | A1* | 9/2014 | Song | ........................ H04L 63/12 713/168 |
| 2014/0304785 | A1* | 10/2014 | Kafle | .................... H04L 61/1511 726/5 |
| 2014/0351932 | A1* | 11/2014 | Abraham | ............ H04L 12/1863 726/22 |

* cited by examiner

*Primary Examiner* — Mohammad W Reza (74) *Attorney, Agent, or Firm* — David H. Judson (57) ABSTRACT

The techniques herein provide for enhanced overlay network-based transport of traffic, such as IPsec traffic, e.g., to and from customer branch office locations, facilitated through the use of the Internet-based overlay routing infrastructure. This disclosure describes a method of providing integrity protection for traffic on the overlay network.

10 Claims, 6 Drawing Sheets

| SENDER | RECEIVER | SECRET USED |
|---|---|---|
| TRUSTED | TRUSTED | TRUSTED-SECRET |
| TRUSTED | UNTRUSTED | UNTRUSTED-SECRET |
| UNTRUSTED | UNTRUSTED | UNTRUSTED-SECRET |
| UNTRUSTED | TRUSTED | UNTRUSTED-SECRET |

FIG. 8

SECURING AN OVERLAY NETWORK AGAINST ATTACK

BACKGROUND

Technical Field

This application relates generally to overlay network routing over the publicly-routed Internet.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

As an overlay, the CDN resources such as described above also may be used to facilitate wide area network (WAN) acceleration services between enterprise data centers (which may be privately-managed) and third party software-as-a-service (SaaS) providers.

BRIEF SUMMARY

The techniques herein provide for enhanced overlay network-based transport of traffic, such as IPsec traffic, e.g., to and from customer branch office locations, facilitated through the use of the Internet-based overlay routing infrastructure. This disclosure describes a method of providing data integrity and replay attack protections for traffic on the overlay network.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
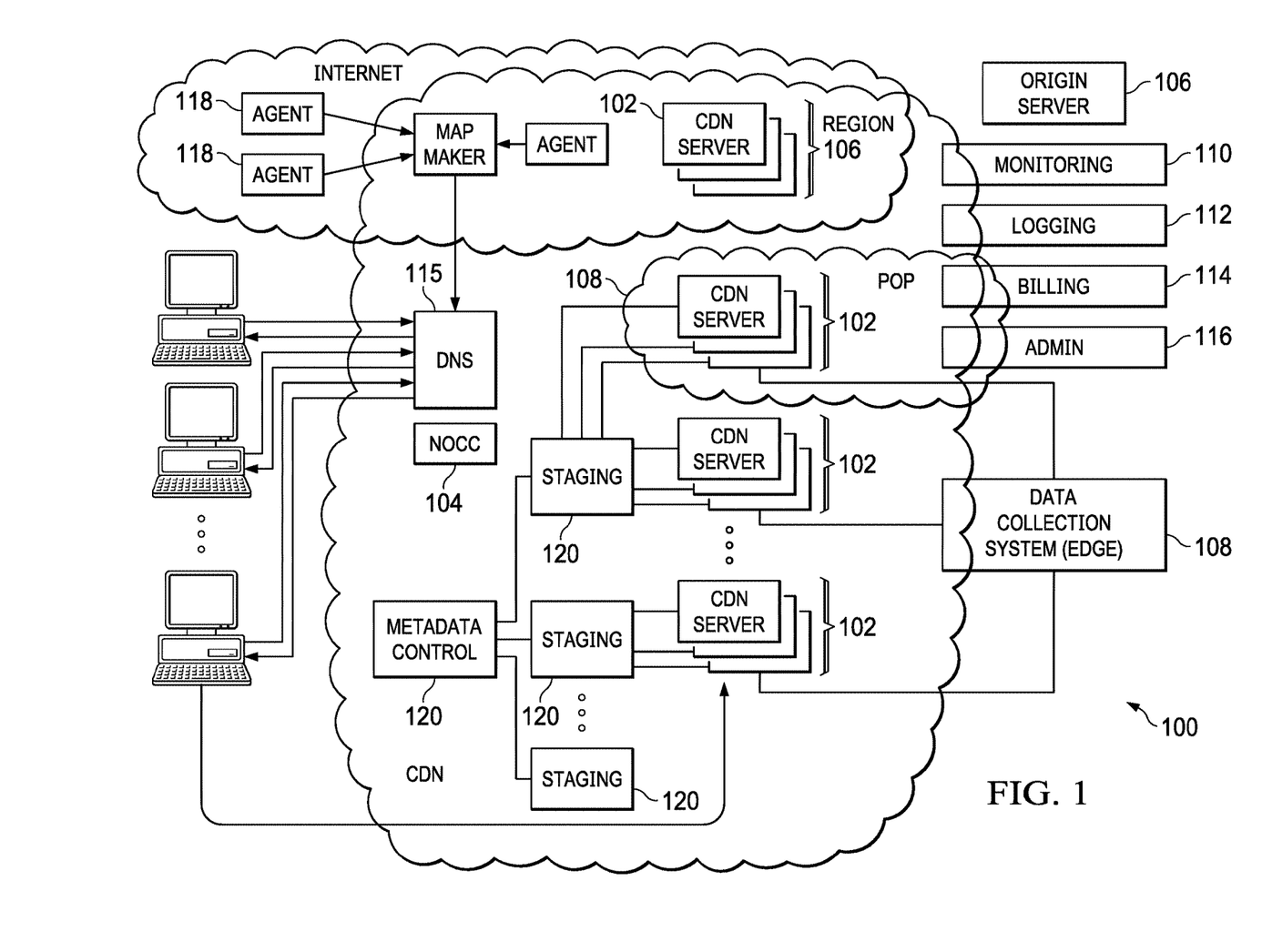
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
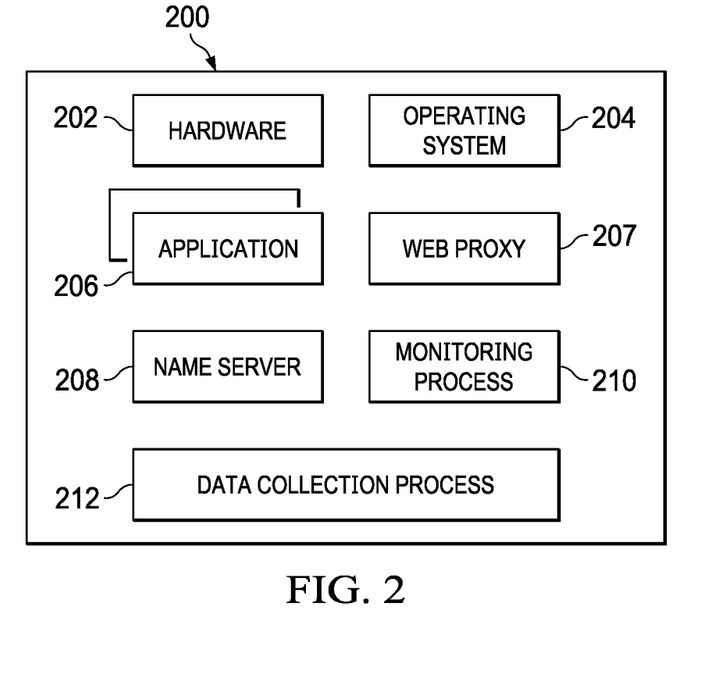
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities). This type of managed solution provides an enterprise with the opportunity to take advantage of CDN technologies with respect to their Company's intranet.

As an overlay, the CDN resources such as described above also may be used to facilitate wide area network (WAN) acceleration services between enterprise data centers (which may be privately-managed) and third party software-as-a-service (SaaS) providers. The following provides additional details regarding this type of solution.

Figure 3:
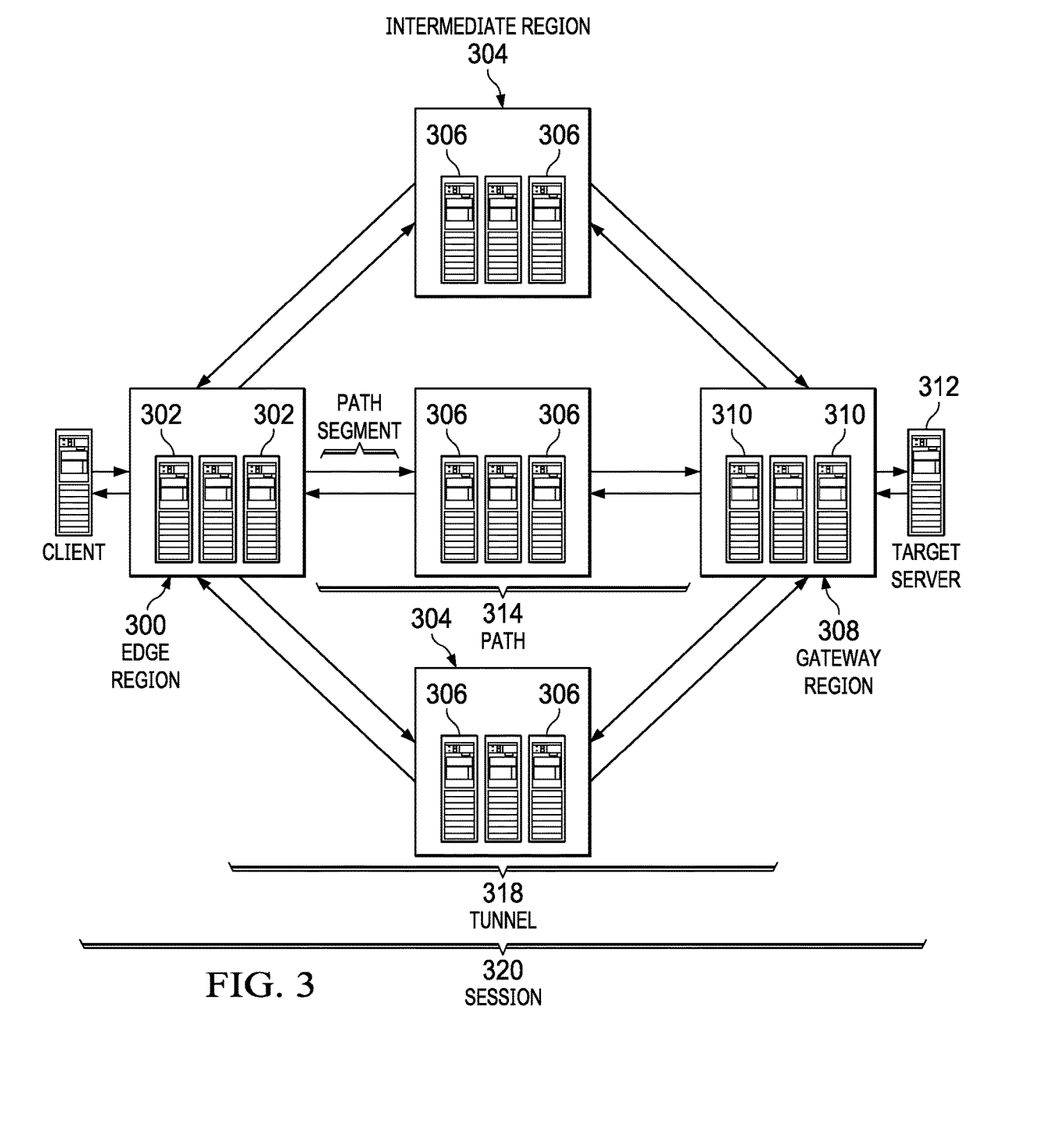
FIG. 3 illustrates a known "overlay" network solution whereby an "overlay" is positioned on top of the publicly-routable Internet.

In particular, FIG. 3 illustrates a known "overlay" network solution whereby an "overlay" is positioned on top of the publicly-routable Internet. This architecture is sometimes referred to as a "routing overlay" or "routing overlay network." The routing overlay network may leverage existing content delivery network (CDN) infrastructure, such as the infrastructure shown in FIGS. 1-2 above, and as provided by commercial services providers such as Akamai Technologies, Inc. of Cambridge, Mass. An overlay network of this type provides significant performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes a packet's destination; Internet routers use the information to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

Many of the machines in the overlay are servers located near the edge of the Internet, i.e., at or adjacent end user access networks. As has been described above, e.g., FIG. 1, third party web sites and application providers offload delivery of content and applications to the network, which operates as a managed service. The overlay network includes distributed infrastructure for data collection, monitoring, logging, alerts, billing, management and other operational and administrative functions. As has been described and as shown in FIG. 2, a typical CDN machine comprises commodity hardware (e.g., an Intel® Pentium® processor) running an operating system kernel (such as Linux™ or variant) that supports one or more applications. To facilitate content delivery services, for example, given machines typically run a set of applications, such as an HTTP Web proxy, a name server, a local monitoring process, and one or more data collection processes. The Web proxy includes or has associated therewith an edge server manager process to facilitate one or more functions associated with the content delivery network.

A known OIP (Overlay Internet Protocol) routing mechanism comprises a representative set of components, as illustrated in FIG. 3:

edge server 302—typically, a CDN edge server running an OIP edge server software process (oidp) as described below. As will be described, this software is responsible for receiving, encapsulating and forwarding IP packets.

edge region 300—typically, a CDN edge region configured for the overlay mechanism.

intermediate server 306—typically, a server that receives encapsulated packets from an edge region 300 or other intermediate servers and forwards them on to other intermediate servers or to a gateway region.

intermediate region 304—a region of intermediate servers.

gateway server 310—typically, an edge server that has been configured to receive encapsulated packets from the overlay, and that applies source network address translation (NAT) to the original packets and forwards them onto the target server.

gateway region 308—typically, a type of edge region comprising gateway servers and that is usually deployed on customer premises.

Target server 312—a machine whose traffic is to be tunneled through the overlay.

target address—the IP address of the target server; this address is sometimes referred to as a direct address when being compared to a CDN virtual IP address.

slot—a single "instance" of the overlay; preferably, a slot is a numbered index that corresponds to a single target address.

virtual IP address—typically, a CDN address that corresponds to a slot; preferably, there is one virtual IP address per edge region per slot. It is sometimes referred to as a VIP.

path 314—an ordered set of CDN regions between an edge region and a gateway region.

path Segment 316—a single hop of a path.

tunnel 318—a set of one or more paths from an edge server to a gateway server.

session 320—A single end-to-end connection from the client 322 to the target server; preferably, the session is defined by a five tuple (IP payload protocol, source address, destination address, source port, destination port). The source is the client and the destination is the target.

Typically, a "region" as used herein comprises a co-located set of edge machines, e.g., a rack of edge servers.

Figure 4:
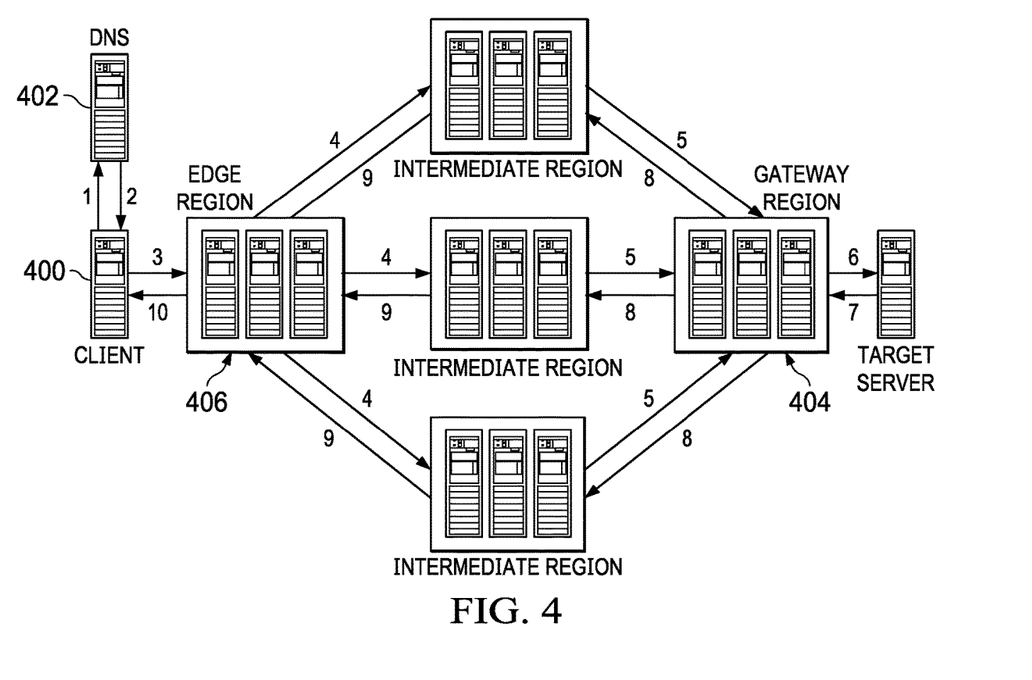
FIG. 4 depicts a use case in which an edge server in an overlay network edge region sends out multiple copies of encapsulated packets along multiple paths to facilitate an interaction between a requesting client and a target server.

In one known use scenario of the overlay network, one or more clients desire to send packets to a single IP address. This is illustrated in FIG. 4 and is now described. At step 1, the client 400 makes a DNS request to resolve a hostname, typically a hostname associated with a web-accessible application. This hostname is aliased (e.g., by a CNAME) to a domain that is being managed by an authoritative DNS 402; typically, the authoritative DNS is managed by the CDN service provider. Preferably, this hostname corresponds to a single gateway region (and target address) 404. This is also referred to as a slot, as described above. At step 2, the DNS query returns a single IP address for the hostname. This address identifies a best performing available edge region 406 and, preferably, that region is dedicated to the hostname. The address is referred to as a virtual IP address, as described above. At step 3, the client 400 begins to send IP packets to the virtual IP address. These packets are received by a server in the edge region 406. The edge region 406 knows the gateway region 404 to which to send the packets based on the destination address in the IP packet header. The packet is then encapsulated. At step 4, and based on routes preferably provided by a CDN mapping system, the edge server in the edge region 406 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 404, once again, preferably based on routes provided from the CDN mapping system. At step 6, the packets are received by a server in the gateway region 404, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 406 from which the client packet originated. At step 7, the gateway region 404 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the edge region.

The various connections used in the overlay network and as described typically are secured via SSL or other transport layer security (TLS) techniques.

A virtual private network (VPN)-as-a-service (or more generally, "network-as-a-service") can be facilitated using an overlay IP (OIP) routing mechanism such as shown in FIG. 3. The notion of networking "as a service" enables enterprises to effectively utilize Internet links as an optimized wide area network (WAN), connecting branches, data centers, teleworkers and mobile users to applications over the Internet. Driven by the impact of cloud computing and mobility, enterprises need a network service that can deliver an optimal and predictable cloud experience to users, preferably a network that is low-cost, easy-on, and global with security and optimization built-in.

Figure 5:
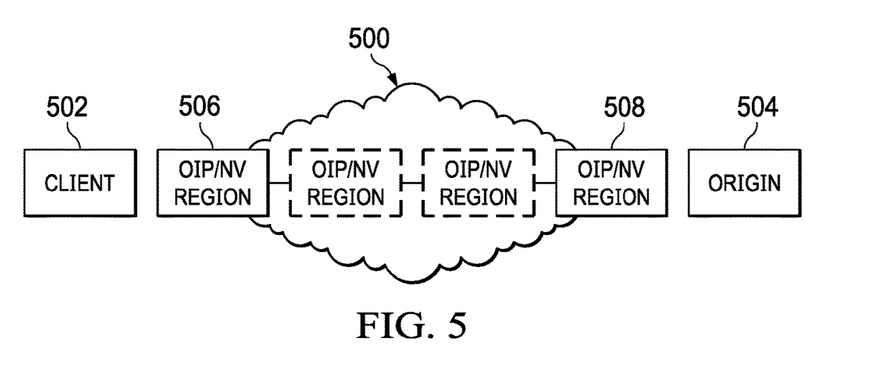
FIG. 5 illustrates how an overlay network appliance at one endpoint establishes a secure logical VPN tunnel to a nearby edge region or regions of the overlay network.

FIG. 5 illustrates how an overlay network appliance 500 at one endpoint establishes a secure logical VPN tunnel 502 to a nearby edge region or regions 504 of the overlay network 506. In this context, the network appliance 500 typically provides IPSec-based authentication and flow-based encryption, and the secure logical VPN tunnel 502 may incorporate one or more encrypted flows. Preferably, the edge 504 uses communications (e.g. keep-alive signaling) to maintain the tunnel through the enterprise firewall 508. When the overlay network customer desires to connect its local (inside the firewall) network, it can use the Internet-based overlay by having the appliances positioned at or adjacent to each endpoint when the local network connects to the Internet.

A description of this network-as-a-service approach is provided in U.S. Publication No. 2015/0188943.

An enhanced overlay network-based transport of traffic, such as IPsec traffic, e.g., to and from customer branch office locations, facilitated through the use of the Internet-based overlay routing infrastructure is described in U.S. Publication Nos. 2017/0195161, 2017/0195217 and 2017/0195237. The approach there describes, among other things, a method of managing and enforcing quality-of-service (QoS) in an Internet-based overlay network shared by a set of content provider customer entities. For each entity having a customer branch, the customer branch is coupled to the Internet-based overlay routing network. A quality-of-service (QoS) policy is configured for the customer. According to the method, utilization of the Internet-based overlay network against the configured QoS policy is then monitored. The QoS is then enforced for the customer and at least one other customer, based in part on the QoS policies. Capacity preferably is enforced for a customer entity according to the QoS policy at one of: a global level, a geographical region level, and at the customer branch level.

With the above as background, the techniques herein provide for enhanced overlay network-based transport of traffic, such as IPsec traffic, e.g., to and from customer branch office locations, facilitated through the use of the Internet-based overlay routing infrastructure (OIN) described above.

Overlay Network Integrity Protection

The SRIP network overlay as described above utilizes a UDP-based tunneling protocol to transport packets from an ingress OIP edge region to an egress OIP gateway region, typically via a number of intermediate (midgress) OIP forwarding regions. The following describes a design for providing integrity protection and anti-replay service for packets on the overlay between edges and gateways.

The following is a glossary of terms used herein.

Figure 6:
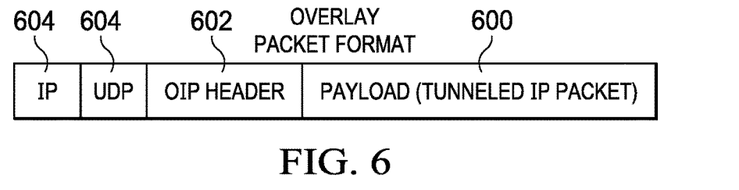
FIG. 6 depicts a typical packet header used in the overlay network transport.

As depicted in FIG. 6, the OIP overlay tunnel protocol encapsulates a full IP packet 600 entering the overlay within a OIP tunnel packet header 602, which is then encapsulated within a standard IP/UDP packet 604. The outer IP header is destined to a service IP for the next hop in the forwarding path.

While providing significant advantages, the overlay protocol does not provide integrity protection or encryption natively. This leaves the overlay potentially vulnerable to attacks based on reverse engineering the packet format, and replay attacks. Further, additional use cases for the OIP network may present new attack vectors. In this operating scenario, traffic comes into the overlay edge network via IPsec tunnels established with customer devices, which ensure that the traffic is authenticated. The edge network strips the IPsec headers out, and it passes the unprotected traffic into the overlay. Although there are several potential attack scenarios, the main attacks are packet injection and replay attacks. Either may result in denial of service attacks towards the OIP network as well as the customer network. In addition to that, they make the networks vulnerable to TCP and UDP attacks like SYN floods, packet floods,

| | |
|---|---|
| Collection | See KMI Collection. |
| CPE | Customer Premise Equipment |
| Data Origin Authentication | A security service that verifies the identity of a claimed source of data. This service is usually bundled with a connectionless integrity service. |
| DDOS | a Distributed Denial of Service (attack) |
| Definition | See KMI Definition. |
| Edge | An OIP region serving a logical ingress role from a client for a given flow. |
| Endpoint | An IPsec endpoint |
| ESP | Encapsulating Security Payload (IPsec) |
| Gateway | An overlay network region serving a logical egress role to an origin server for a given flow |
| HMAC | Hashed Message Authentication Code |
| ICV | Integrity Check Value |
| Integrity | A security service that ensures that modifications to data are detectable; Connectionless integrity is a service that detects modification of an individual IP datagram, without regard to the ordering of the datagram in a stream of traffic. |
| KMI | Key Management Infrastructure that organizes secrets into Collections, Definitions, and Indices. |
| IPsec | Internet Protocol Security |
| KMI Collection | Collections are groupings of definitions, where a definition represents a specific type of secret for a specific purpose; preferably, access and distribution are controlled at the collection level, and collections are distributed over a transport channel |
| KMI Definition | A definition represents a specific type of secret for a specific purpose. |
| KMI Secret | A secret is referenced by an index in the KMI definition. There can be multiple indices of a given secret in a definition; preferably, such secrets are referenced using formatted strings called secret selectors: /Col=collection_name/Def=definition_name/Idx=index_name Each secret has a status that is either "active" or "expired". Secrets preferably also have an attribute named "current." This boolean attribute is true or false based on whether a particular index is the "current" index for a definition. |
| Machine | An individual peer machine in an overlay network region. |
| MDT | An overlay network transport mechanism |
| MTU | Maximum transmission unit |
| NV Overlay | A set of enterprise-focused functionality added to the overlay network that provides an IPsec transport solution to improve performance and reliability between branch routers and Service Provider's VPN concentrators. |
| Overlay | Refers to the overlay |
| pMTU | Path MTU |
| Peer | In-region peer machine |
| OIP | The above-described overlay network mechanism |

As depicted in FIG. 5, the OIP network 500 transports packets from the client 502 to the origin 504 and back via the overlay. Packets from the client 502 enter the overlay and packets to the client leave the overlay via a machine in edge region 506. A machine in a gateway region 508 performs the same function for the origin.

connection floods, and so on. In a packet injection attack, an attacker who can reverse engineer the overlay tunnel protocol may be able to inject packets. These packets may be forwarded to the customer's network by edges, and gateways. These packets could circumvent Reverse Path Filtering on the path to the CPE because the source address is masked by the tunnel back to the CPE. In a replay attack, the overlay packets can be replayed by an attacker. Machines typically do not do any kind of replay checks, and these replayed packets may be relayed to the clients and origins. As noted above, typically packets reach the OIP network via IPsec tunnels, and these clients and origins may be inside a private network. Replay of UDP packets would be easier than TCP because it has no established sessions to check.

One object of providing overlay integrity protection according to the techniques herein is to protect customers of the platform from attacks on the overlay. The scope of the integrity protection typically is limited to packets that arrive over the overlay, including the ones that are in-region forwarded by oipd after they arrive from the overlay. To that end, the solution described below satisfies certain design objectives, namely, minimizing impact to the overlay per-packet overhead (pMTU), maximizing Service availability (limiting the risk of service impact incidents), minimizing impact on per-packet processing (CPU), and allowing the integrity protection feature to be configurable, preferably on a per-region basis.

In particular, the overlay is used to transport tunneled IPsec traffic as well as TCP traffic, therefore it is an objective that the platform minimizes additional overhead added by the overlay to provide acceptable pMTU values through the system. To this end, preferably pMTU discovery is implemented on the NV overlay edge to allow IPsec endpoints to appropriately adjust their MTU's to accommodate the additional tunnel overhead added by the system. Additional packet overhead reduces overall throughput, therefore any overhead added by the system must be minimized.

Overlay packet processing is handled by an overlay thread. As will be described, additional processing due to integrity check value creation and verification is minimized by selecting an algorithm that provides sufficient security while being optimized for the hardware.

Other design objectives that are met by the approach herein include protecting the overlay network customer network, ensuring that per-region capacity and per customer capacity are not adversely impacted by an attack (as spoofed packets can result in load on machines, including creation of connection entries), and the like. As will be seen, the approach herein implements an integrity check mechanism the provides sufficient protection against brute force attacks and provides protection against replay attacks. Another objective is the provision of federated security, which as will be described includes the notion of applying appropriate safeguards to traffic when the traffic arrives on a machine based on the trust level of the sender and of the overlay channel. Preferably, a region is not able to represent itself to a region with a higher trust level as more trusted than it is.

The following provides a detailed design that provides these objectives.

In a first embodiment, an Integrity Check Value (ICV) is added to packets sent on the overlay to provide data origin and anti-replay protection. The following provides a preferred approach.

Preferably, all (or some defined group of) machines in the overlay network share a secret, called the oidp overlay master secret or the overlay secret (whose computation is described below), which is used to compute the message authentication code, or the ICV. Preferably, a sending machine in the overlay adds the ICV to the Tunnel Header 602 (FIG. 6) for packets transported over overlay. Only packets with correct ICV values are then accepted for processing. ICV computation preferably is over a set of fields in the OIP tunnel header and data as defined below. Received packets preferably are checked against a sliding window based on a sequence number, and also a sliding window based on the current time. The edge and gateway in a flow participate in the protection scheme. Preferably, the forwarders do not.

Preferably, the protection is provided per stream. A stream is a unidirectional UDP connection between two OIP machines in different regions. Preferably, all machines in the network are time-synchronized via NTP. In one embodiment, each region-pair uses a key derived from the overlay secret. This increases the difficulty of a brute force attack on the network. The Key Management Infrastructure (KMI) preferably is used for the overlay secret generation, distribution, and rotation.

Figure 7:
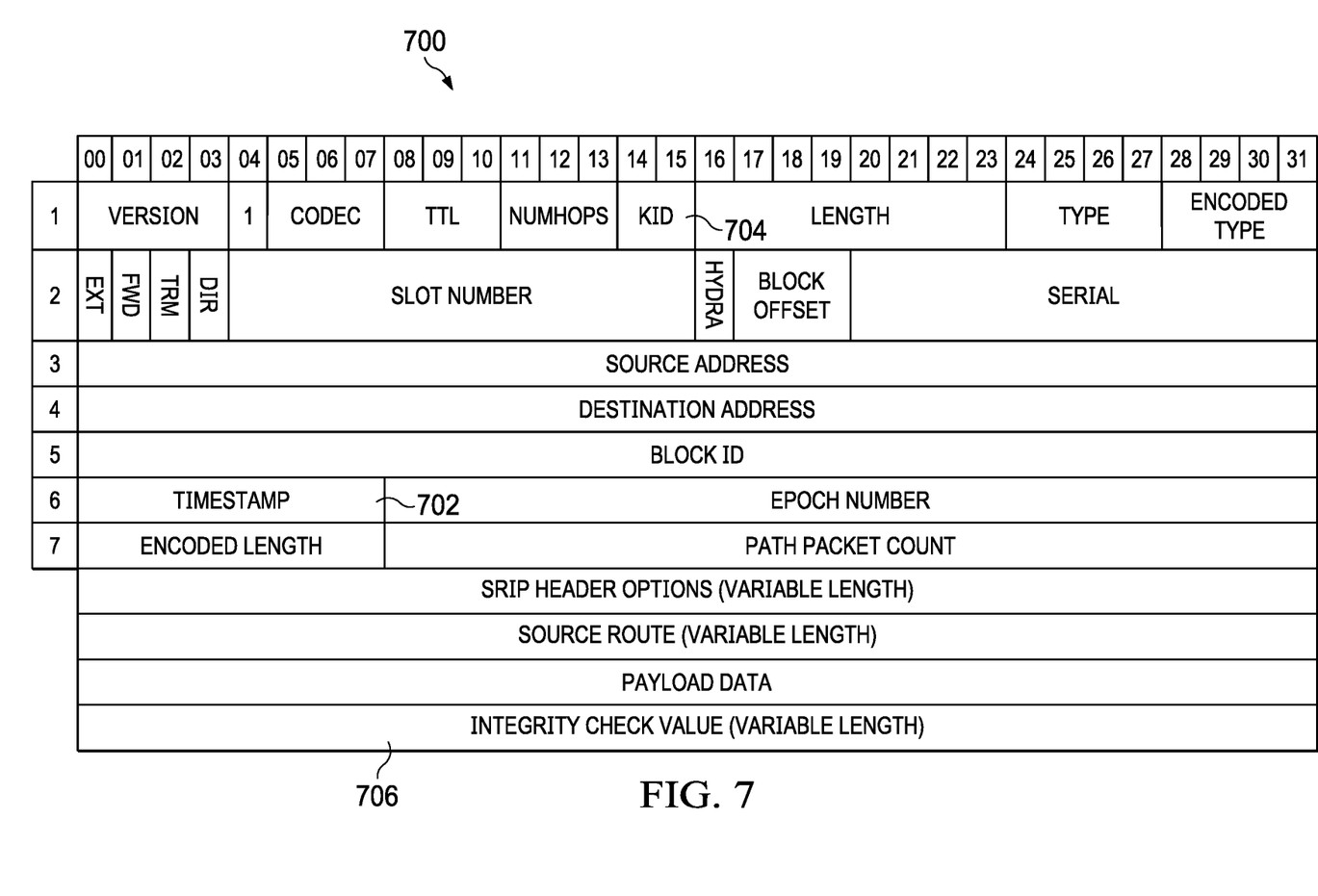
FIG. 7 depicts a modified packet header used to facilitate an integrity protection scheme according to an embodiment of this disclosure.

FIG. 7 depicts a preferred structure of a protected tunnel packet header that is used to facilitate ICV use according to this disclosure. The OIP Tunnel Packet Header format 700 specifies the new fields added, namely: TimeStamp 702, KID 704, and Integrity Check Value field 706.

The relevant fields in the header 700 are set forth below:

| Field | Description |
| --- | --- |
| Version | A current version number |
| TTL | Time to Live. One more than a number of oidpfwd hops remaining. (This field is zeroed out in the ICV calculation.) |
| Fwd | Forward bit: set to 1 when packet has previously been forwarded in-region at the receiving end. (This field is zeroed out in the ICV calculation.) |
| Block ID | A number starting at a random value that is used to account for a maximum number of packets that could be sent in a second |
| Block Offset | An ordinal position of this packet within the block. |
| Epoch Number | Time when process started up in seconds since the epoch, and The value remains unchanged for a process, until a restart. |
| KID | This field give a hint to receiver about the KMI secret picked by the sender. The lower order bits of the secret index preferably are set here. |
| Timestamp | Time when packet is sent in seconds since the epoch. 8 bits. Preferably, only the least significant 8 bits of the current time in seconds is sent in the header. The ICV computation preferably uses a 32-bit current timestamp in the computation. |
| Integrity Check Value | New field added to hold the value computed using the derived per-region-pair key over the fields as indicated above. |

The Epoch Number, Timestamp, Block ID and the Block Offset together uniquely identifies a packet, allowing detection of replayed packets.

A machine sending a packet sets the Timestamp to the current time in seconds, and the Block ID to a next value of a 32 bit counter. The Block Offset is set by a redundancy module, and preferably it is unique to each packet sent. After the tunneled packet is created, the ICV is computed and set in the header as described below.

Epoch Number is set to the current time after a sender restarts. The value remains unchanged until the machine restarts again, and so acts as an indicator to the receiver of the restart, so it can re-initialize its sequence window for accepting packet.

The following describes a preferred technique to compute the ICV for the packet. In particular, ICV is message authentication code that is computed over the following fields: (1) source and destination addresses in the outer IP header; (2) OIP header with the following changes: TTL field zeroed out, "Fwd" field zeroed out, and ICV field zeroed out; (3) SRIP Options, if any, and (4) inner packet.

Preferred key and algorithms used for the calculation are detailed in the following sections. Candidate algorithms include, without limitation, SipHash, HMAC-SHA256 and AES-CMAC.

Key derivation proceeds as follows. Preferably, ICV calculation uses per-region-pair keys derived using an HMAC-based Extract-and-Expand Key Derivation Function (HKDF) defined in RFC 5869 as the model. HKDF uses an extract-then-expand paradigm. The input keying material for the extract phase preferably is the overlay secret, which as noted above is known to the machines in the network. An application specific "info" value is used to make the key used to compute the ICV unique for each region pair. The format for the value preferably is as follows: source region number|destination region number|hour of the day. The salt value may be set to a configured value. Preferably ICV length (using SipHash for example) is 8 bytes, and this value may be used without being truncated. In the alternative, the ICV given by the computation may be truncated when a different algorithm is used. ICV length of the field may be made configurable at that time.

When a packet is received, preferably the following verification steps are performed: one or more sanity checks (including version number check), time window check, sequence window check, ICV verification. Sanity checks window are first checked for duplicate, and then for ICV correctness. Preferably, only if both tests pass is the packet accepted. If a packet is received that has a Block ID to the right of the window, the packet ICV is checked and if found correct, the window slides so that the new value is the right edge of the window. A packet that has Block ID less than the left edge of the window is dropped. The value of Epoch Number in the header is saved by the receiver. A newer value of Epoch Number acts as an indicator of a sender restart, and this causes the receiver to re-initialize its sequence window for accepting packets.

The following describes sender or receiver restart operations. While a sender is starting up, any replay packets from the sender (sent by an attacker) are not accepted by the receiver due to the normal checks perceiving the packets as being duplicates. When a receiver starts up, there is a window of time where it will accept replay packets from an attacker. This situation can last either until the sender sends a packet, or until the secret valid for that time period expires, or the duration of the time window, whichever happens first.

In-region forwarded packets are processed as follows. Packets arriving from the overlay to a machine at the overlay port may be forwarded to another machine in the region, depending on factors including load and outer tunnel migration. These packets have their ICV checked twice—the second time being on the machine that is the recipient of the in-region forwarded packets.

The following provides a preferred scheme for key management. As described above, preferably a Key Management Infrastructure (KMI) is used for generating, storing, distributing, and rotating master secrets. KMI access and distribution is at the "collection" level, and a new collection is defined. The collection preferably is automatically generated by KMI, and distributed over MDT to the subscribers, which typically will be all the machines in the OIP and related networks. As also defined, KMI collections have "definitions" defined under them, and the secret to be used for a specific algorithm is then a definition in the collection.

| | |
|---|---|
| Collection | oipoverlay_secrets |
| Definition | oipoverlay_secret_siphash # Format oipoverlay_secret_<algorithm indicator, which includes the ICV length indication also> |
| type | symmetric_key | include checks for version number, slot number, length, TTL and so on. Once a packet passes these checks, it is passed on for time window check. The time window check is primarily meant to deal with the increased risk of replays when oipd has recently restarted on either the sender or the receiver. The timestamp on a received packet is checked to see if it falls within an appropriate time interval. To facilitate the sequence window check, the receiver maintaining a sliding window of sequence numbers it will accept from a given sender. Preferably, the sequence number for an overlay packet is the combination of the Block Number and the Block Offset. The first packet that the receiver receives sets a right edge of the sliding window. The Block IDs within the Representative parameters that determine the lifetime of a secret are given below.

| | |
|---|---|
| provision_date | Time when the secret is provisioned |
| refresh_date | Time when a new secret will be generated for the Definition. The refresh time for the secret will be defined at a value much larger than KMI's key distribution time for the OIP network. |
| expire_date | Time when KMI stops distributing the secret to edges. |

Preferably, the secrets within a definition are distinguished by an index, which functions like a version number. A secret is distributed by KMI and is marked as active for use by a machine during the period between the provision_date and expire_time. Preferably, the KID field in the OIP header is to some number of bits of the index of the selected secret. If the receiver finds that there are gaps in the indices that it has, it checks with more than one match for KID.

Figure 8:
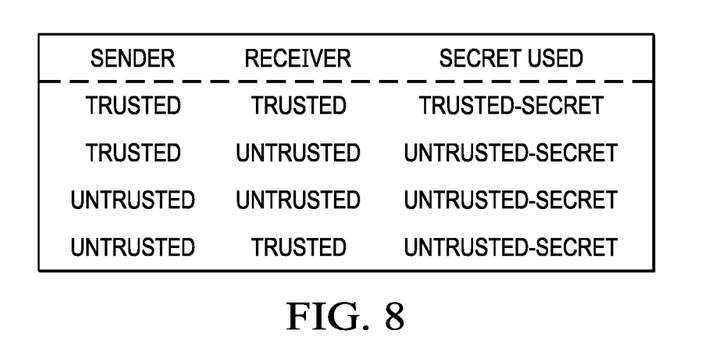
FIG. 8 depicts a representative set of region-based trust constraints that are implemented in a federated security scheme according to another aspect of this disclosure.

Preferably, and according to another aspect herein, federated security is implemented by defining multiple trust levels, and having KMI collections associated with each trust level. Configuration informs the network about what trust levels are associated with each region in the network. FIG. 8 depicts a table showing a representative federated security scheme when there are only two (2) trust levels, namely, trusted and untrusted, and the sender picks the secret then based on the rules shown in the table.

Generalizing, and as used herein, federated security is the ability to prevent any region from impersonating another region when sending packets over the overlay. The following section describes a solution and, in particular, wherein public and private key pairs per region are utilized. By implementing the technique herein, a region is not able to impersonate another region for packets on the overlay. The federated security scheme also dictates that it should not be possible to change the trust level and rules around a region, e.g., upon short notice. Thus, for example, an overlay network region belonging to a certain country or region group at one time may belong to a new one, but only at a different time.

The following describes further details of the federated security scheme of this disclosure. As described above, the OIP network sends packets from the edge (region) to the gateway (region) over the overlay using a UDP tunneled protocol. As noted, an aim of the federated security feature is to prevent packet injection including replays. In the first embodiment described above, a keyed hash value is added to each packet to let the receiver verify the packet. The packet has to pass time window check, sequence window check and hash value check, before it is accepted. The first embodiment involves adding a timestamp field and a keyed hash based on a globally shared symmetric secret to an overlay packet and subjecting the packet first to a time window check and then a sequence window check at the receiver.

A preferred approach is the federated security scheme now described. In this alternative embodiment, preferably every region has its own private and public key pair. A region derives its shared secret with another region using its private key and the other region's public key. Preferably, the regions in the network are categorized into a few large collectives, sometimes referred to herein as "mega-geos." A mega-geo corresponds to a KMI collection, with the secrets for each region belonging to that mega-geo defining a definition under that collection. Regions within a mega-geo are able to impersonate each other because they can read the private keys of other regions in the mega-geo, but not ones in a different mega-geo. An alternative approach is to use definition-level access control. Note that all public keys in all the collections can be read by all regions. Once configured in this manner, preferably Elliptic Curve Diffie-Hellman (ECDH)-generated keys are distributed by KMI. An ECDH key secret type is ssh_id. ssh_id has two data blocks, named "public" and "private". Optional parameters are "key_type", which is equivalent to ssh-keygen's "-t", and "key_size", equivalent to ssh-keygen's "-b". This supports auto-generation. The secret derived from the sender's private key and receiver's public key preferably is passed through an HKDF function that uses SipHash as the hash function, to thereby derive the key to use in generating the ICV. Preferably, policies on which regions any region can communicate with can be supported. There is of course implicit policy by defining the mega-geo to which a region belongs.

Shard secret derivation preferably proceeds as follows. When a region needs to send to another region, the sending region and the receiving region agree on the secret for key derivation to generate the ICV on the packet. A preferred approach is for each region to generate the key from its own private key and the other region's public key. Thus, for example, shared key derivation using ECDH assumes two public and private elliptical curve secrets, namely:
/Col=srip_overlay_auth_core/Def=Region_xxx/Idx=0
block=public (pxxx) block=private (dxxx)
/Col=srip_overlay_auth_core/Def=Region_xyz/Idx=0
block=public (pxyz) block=private (dxyz), where:
d # is the region's private key represented as a random integer between 1 and n−1, where n is the order of the subgroup; and
p #, the public key is the point H=dG, where G is the base point of the subgroup.
Note that G, n, etc. are domain parameters specific to the curve definition. Standard bodies publish domain parameters of elliptic curves for common field sizes, which are called standard curves or named curves.
Region xxx calculates the shared key S_xxx_xyz=dxxx*pxyz
Region xyz calculates the shared key S_xyz_xxx=dxyz*pxxx
where * represents scalar multiplication, and S_xxx_xyz=S_xyz_xxx, so both regions have the same shared key.

The following describes additional details regarding the integration with the KMI system. Preferably, each mega-geo has a KMI collection defined, with each region in the mega-geo having a definition under the collection. A region can read all public keys in its own collection and the public keys in all other collections. A region subscribes to all the mega-geo collection and not just its own. A region can read the private keys of every other region in the mega-geo to which it belongs, enabling a region to impersonate these other regions. Because a region cannot read the private keys of regions in another mega-geo, however, the region cannot impersonate a region in another mega-geo.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

Preferably, the point of entry into the overlay network is through a VPN tunnel between a client machine and an edge region.

The techniques herein generally provide for the above-described improvements to a technology or technical field, as well as the specific technological improvements to various fields including distributed networking, Internet-based overlays, WAN-based networking (using MPLS or otherwise), secure utilization of Internet links, and the like, all as described above.

Having described our invention, what we claim is set forth below.

The invention claimed is:

1. A method operative in an overlay network configured to provide UDP-based packet transport across the publicly-routed Internet between and among regions of co-located servers, the regions comprising at least one ingress edge region, and at least one egress gateway region, comprising:
associating a private key pair to each region of co-located servers;
deriving a shared secret across a pair of regions, the region pair operating according to a trust scheme;
using the shared secret to generate a key;
using the key and additional data to compute an integrity check value (ICV), wherein the integrity check value is unique to the region pair; and
incorporating the ICV into an overlay network packet header associated with each data packet communicated between the region pair during a flow.

2. The method as described in claim 1 further including:
receiving the data packet at a machine in the region pair;
determining whether ICV is valid; and
forwarding the data packet at least in part upon a determination that the ICV is valid.

3. The method as described in claim 1 wherein the region pair comprises the ingress edge region and the egress gateway region, and wherein the data packet is associated with the flow between these regions.

4. The method as described in claim 3 wherein the flow is a unidirectional UDP connection between a machine in the ingress edge region, and a machine in the egress gateway region.

5. The method as described in claim 1 wherein the flow also passes through one or more additional regions.

6. The method as described in claim 1 wherein the other data comprises source and destination Internet Protocol (IP) addresses, and data derived from one or more data fields of the overlay network packet header.

7. The method as described in claim 1 wherein the shared secret is derived by the ingress edge region using a private key of the ingress edge region, and a public key of the egress gateway region, and wherein the shared secret is derived by the egress edge region using a private key of the egress edge region and the public key of the ingress edge region.

8. The method as described in claim 1 wherein the trust scheme comprises a set of trust levels, wherein at least a first trust level in the set has a different degree of trust as compared to a second trust level.

9. The method as described in claim 1 wherein the region pair comprises a collection of regions in the overlay network that are managed according to a same trust level in the trust scheme.

10. The method as described in claim 9 wherein associating the private key pair ensures that a region cannot impersonate another region outside of its trust level.

* * * * *